United States Patent
Madhukar (10) Patent No.: US 9,013,732 B1
(45) Date of Patent: Apr. 21, 2015

(54) USING FONT INFORMATION INSTALLED IN AN OPERATING SYSTEM TO INTERCEPT TEXT BEING PRINTED

(71) Applicant: EMC Corporation, Hopkinton, MA (US)

(72) Inventor: Anadi Madhukar, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/911,455

(22) Filed: Jun. 6, 2013

(51) Int. Cl.
*G06K 15/00* (2006.01)
*G06F 17/21* (2006.01)

(52) U.S. Cl.
CPC ............ *G06F 17/214* (2013.01); *G06K 15/408* (2013.01)

(58) Field of Classification Search
USPC ............................ 358/1.14, 1.1, 1.9; 382/232
See application file for complete search history.

(56) References Cited

U.S. PATENT DOCUMENTS

2009/0086252 A1* 4/2009 Zucker et al. ................ 358/1.14

OTHER PUBLICATIONS

Microsoft, How to Translate Unicode Character Codes to True Type Glyph Indices in Windows 95, http://support.microsoft.com/kb/241020, Feb. 2007.
Microsoft, TrueType Specification, Chapter 2: TrueType Font File, Nov. 9, 2012.

* cited by examiner

*Primary Examiner* — Martin Mushambo
(74) *Attorney, Agent, or Firm* — Ryan, Mason & Lewis, LLP (57) ABSTRACT

Methods, apparatus and articles of manufacture for using font information installed in an operating system to intercept text being printed are provided herein. A method includes intercepting an item of glyph data directed to at least one of a printing device and a display device, wherein the item of glyph data comprises a font-specific representation of a text character associated with a device context of the at least one of the printing device and the display device, converting the item of glyph data to an item of text data based on one or more items of font-specific information, analyzing the item of text data to classify one or more aspects of content in the item of text data, and analyzing the one or more aspects of content in the item of text data against one or more data policies to determine eligibility of the item of text data for transmission to the at least one of a printing device and a display device.

16 Claims, 6 Drawing Sheets

| SEGMENT NUMBER | STARTING UNICODE VALUE | ENDING UNICODE VALUE | DELTA | OFFSET | GLYPHS |
|---|---|---|---|---|---|
| 0 | 32 | 126 | -29 | 0 | 172 |
| 1 | 160 | 383 | 0 | 174 | 163 |
| 2 | 402 | 402 | -236 | 0 | 132 |
| 3 | 506 | 511 | -139 | 0 | 133 |
| 4 | 536 | 539 | -65411 | 0 | 188 |
| 5 | 710 | 711 | 0 | 614 | 150 |
| 6 | 713 | 713 | -497 | 0 | 230 |
| 7 | 728 | 733 | 0 | 614 | 134 |
| 8 | 894 | 894 | -521 | 0 | 142 |
| 9 | 900 | 906 | -526 | 0 | 139 |
| 10 | 908 | 908 | -527 | 0 | 157 |
| 11 | 910 | 929 | -528 | 0 | 169 |
| 12 | 931 | 974 | 0 | 616 | 164 |
| 13 | 1025 | 1036 | -580 | 0 | 256 |
| 14 | 1038 | 1103 | -581 | 0 | 138 |
| 15 | 1105 | 1116 | -582 | 0 | 257 |
| 16 | 1118 | 1119 | -583 | 0 | 131 |
| 17 | 1168 | 1169 | -631 | 0 | 147 |
| 18 | 7808 | 7813 | -7269 | 0 | 240 |
| 19 | 7922 | 7923 | -7377 | 0 | 241 |
| 20 | 8211 | 8213 | 0 | 688 | 141 |

FIG. 4

| SEGMENT NUMBER | STARTING UNICODE VALUE | ENDING UNICODE VALUE | DELTA | OFFSET | GLYPHS |
|---|---|---|---|---|---|
| 0 | 32 | 126 | -29 | 0 | 172 |
| 1 | 160 | 383 | 0 | 174 | 163 |
| 2 | 402 | 402 | -236 | 0 | 132 |
| 3 | 506 | 511 | -139 | 0 | 133 |
| 4 | 536 | 539 | -65411 | 0 | 188 |
| 5 | 710 | 711 | 0 | 614 | 150 |
| 6 | 713 | 713 | -497 | 0 | 230 |
| 7 | 728 | 733 | 0 | 614 | 134 |
| 8 | 894 | 894 | -521 | 0 | 142 |
| 9 | 900 | 906 | -526 | 0 | 139 |
| 10 | 908 | 908 | -527 | 0 | 157 |
| 11 | 910 | 929 | -528 | 0 | 169 |
| 12 | 931 | 974 | 0 | 616 | 164 |
| 13 | 1025 | 1036 | -580 | 0 | 256 |
| 14 | 1038 | 1103 | -581 | 0 | 138 |
| 15 | 1105 | 1116 | -582 | 0 | 257 |
| 16 | 1118 | 1119 | -583 | 0 | 131 |
| 17 | 1168 | 1169 | -631 | 0 | 147 |
| 18 | 7808 | 7813 | -7269 | 0 | 240 |
| 19 | 7922 | 7923 | -7377 | 0 | 241 |
| 20 | 8211 | 8213 | 0 | 688 | 141 |

USING FONT INFORMATION INSTALLED IN AN OPERATING SYSTEM TO INTERCEPT TEXT BEING PRINTED

FIELD

The field relates generally to information technology, and more particularly to glyph-to-text conversion.

BACKGROUND

Security software that needs to intercept data being printed so as to perform text analysis on the data faces challenges in analyzing such data. For example, items of data being sent to a printer are commonly not in plain text. Rather, such items of data are typically in-memory representations, such as one or more glyphs, of the how the printer should print the data.

Existing approaches for glyph-to-text conversion include calculating the text from the glyph using a constant difference value. However, with such approaches, the text calculated for non-American standard code for information interchange (ASCII) and/or non-English characters is often inaccurate. Such inaccuracy leads to incorrect text being classified as well as failures in the classification of multilingual documents when printed.

Accordingly, there exists a need for techniques to use font information present in a given operating system to accurately convert glyphs rendered to a device to text for content analysis.

SUMMARY

One or more illustrative embodiments of the present invention provide techniques for using font information installed in an operating system to intercept text being printed.

In accordance with an aspect of the invention, a method is provided comprising the steps of: intercepting an item of glyph data directed to at least one of a printing device and a display device, wherein the item of glyph data comprises a font-specific representation of a text character associated with a device context of the at least one of the printing device and the display device, converting the item of glyph data to an item of text data based on one or more items of font-specific information, analyzing the item of text data to classify one or more aspects of content in the item of text data, and analyzing the one or more aspects of content in the item of text data against one or more data policies to determine eligibility of the item of text data for transmission to the at least one of a printing device and a display device.

The glyph-to-text conversion techniques of the illustrative embodiments overcome one or more of the problems associated with the conventional techniques described previously, and accurately apply policies on multilingual and non-English documents. These and other features and advantages of the present invention will become more readily apparent from the accompanying drawings and the following detailed description.

BRIEF DESCRIPTION OF THE DRAWINGS

FIG. 3 is a diagram illustrating an example calculation of a glyph for a particular font for a text character's Unicode value derived from a character map;

DETAILED DESCRIPTION

As will be described, the present invention, in one or more illustrative embodiments, provides an algorithmic approach to use the font information already installed in an operating system (OS) to intercept and accurately analyze text when the text is transmitted for display and/or printing.

Illustrative embodiments of the present invention will be described herein with reference to exemplary communication systems and associated processing devices (such as a computer, server, mobile telephone, tablet, etc.). It is to be appreciated, however, that the invention is not restricted to use with the particular illustrative system and device configurations shown.

Additionally, as used herein, the term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device.

As described herein, at least one embodiment of the invention includes using font information present in a given operating system to accurately convert glyphs of text rendered to a device back to text for content analysis. As used herein, a glyph refers to a font-specific representation of a character on a particular device context. Also, font information can include, for example, a character map table that an application uses to convert Unicode character values to glyphs before rendering the glyphs onto a device. A character map table can also be re-used to back-calculate the text from the glyphs. By way of example, intercepting data being rendered on display devices such as printers and monitors can include the use such a back calculation scheme to obtain the text behind the glyph. Additionally, various data loss prevention (DLP) modules include capabilities to view the content of data and classify the data according to what is deemed and/or identified as sensitive by an organization's information security policies.

In an example scenario, a DLP component intercepts items of data that are being printed (or is transmitted for printing) because one of the ways information can leak from an organization is through printed documents. One of the supported policies in a DLP solution is to audit, warn and/or block printing actions when sensitive content is identified and/or targeted for printing. Accordingly, at least one embodiment of the invention includes rendering a DLP component aware of all documents or text that is to be printed from a particular end-point machine within a given organization.

Figure 1:
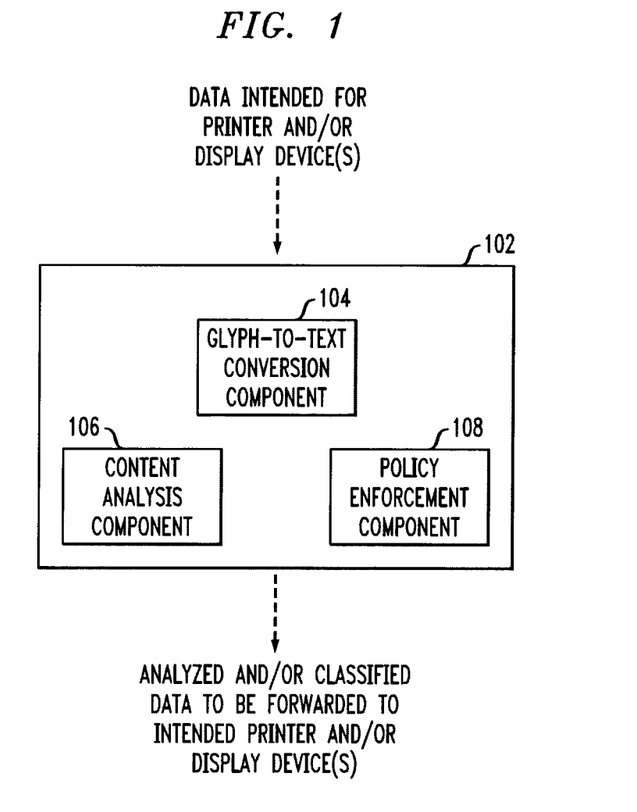
FIG. 1 is a block diagram illustrating an example system implementation according to an embodiment of the invention.

FIG. 1 is a block diagram illustrating an example system implementation according to an embodiment of the invention. By way of illustration, FIG. 1 depicts an interception system 102, which includes a glyph-to-text conversion component 104, a content analysis component 106 and a policy enforcement component 108. As described herein, the interception system 102 can be implemented within a communication device or analogous device or apparatus (such as a computer, server, mobile telephone, tablet, etc.). Additionally, as further detailed herein (for example, in connection with FIG. 2), the system 102 captures glyph data intended for a device such as a printer or a display device, converts the glyph data (or a copy of the glyph data) to text data, and processes the text data via the content analysis component 106 and the policy enforcement component 108 for purposes of content classification and policy evaluation with respect to the captured data based on the content of the data. Subsequently, a copy of the original glyph data is forwarded to a component associated with the intended printer and/or display device, or such transmission is blocked, based on the outcome of the policy evaluation.

Figure 2:
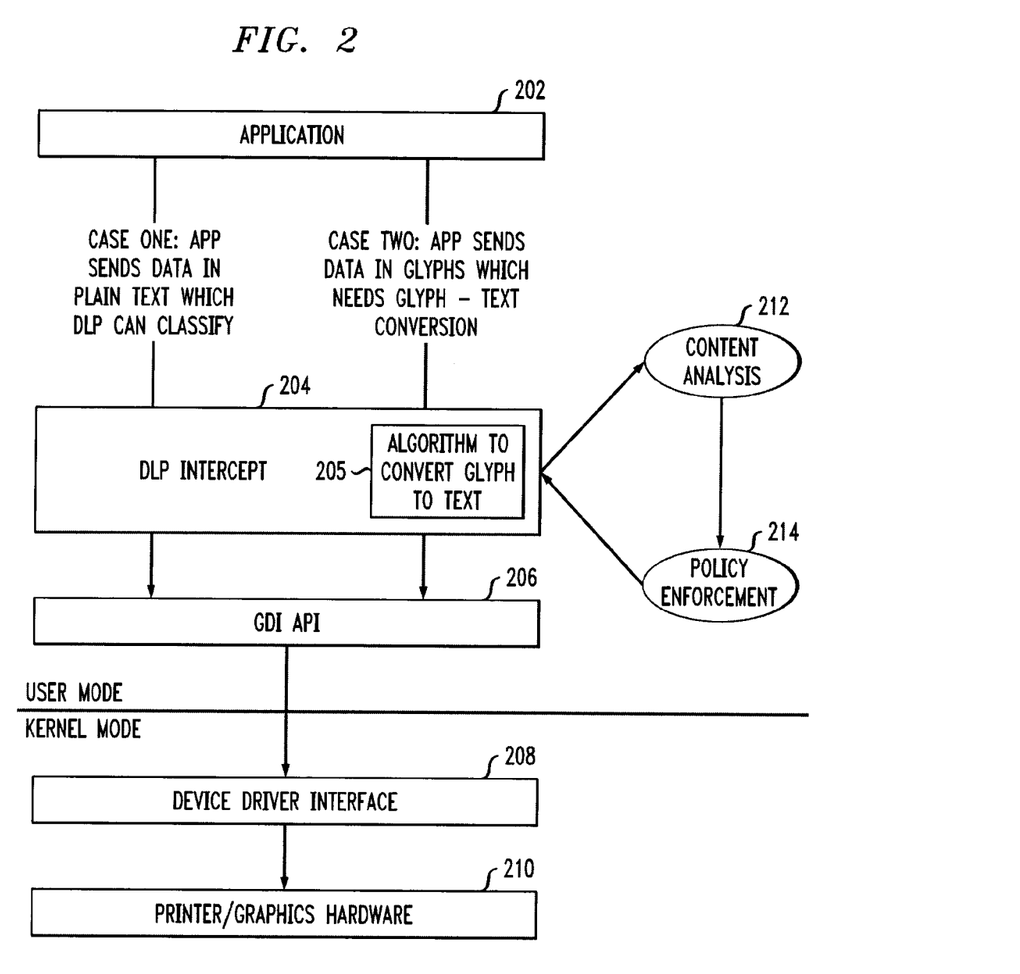
FIG. 2 is a diagram illustrating components for intercepting data being printed, according to an embodiment of the invention.

FIG. 2 is a diagram illustrating components for intercepting data being printed, according to an embodiment of the invention. By way of illustration, FIG. 2 depicts components in a user mode including an application 202 which provides data (as further described below), a DLP interception component 204, a graphics device interface (GDI) application programming interface (API) component 206, a content analysis component 212 and a policy enforcement component 214. FIG. 2 also depicts components in a kernel mode including a device driver interface component 208 and a printer and/or graphics hardware component 210. Accordingly, as detailed herein, at least one embodiment of the invention includes extending to kernel mode modules wherein data can be intercepted in glyph format and converted back to text.

The DLP interception component 204 intercepts GDI APIs from component 206 using an API interception mechanism via a dynamic-link library (DLL) that is injected in different processes running on the system. Accordingly, when the application 202 needs to print material, the application 202 calls and/or summons these intercepted APIs and the DLP interception component 204 is notified of what material is to be printed via the intercepted API.

When the application 202 sets out to print text, these intercepted GDI APIs render the text onto a device context via the device driver interface 208. The device context belongs to the printer 210 which is responsible for printing the document. Additionally, information available in conjunction with the device context is also used by the printer 210 to print the text in the expected font, size and formatting. The DLP component 204 intercepts the APIs, as noted above, to gather the text before the text is rendered to the device 210. The gathered text is sent to content analysis component 212 and policy enforcement component 214 for classification and policy evaluation before printing is blocked or resumed based on the outcome of a given policy evaluation.

During content analysis (via component 212), the input text is analyzed based on the presence of certain keywords, regular expressions, phrases, etc., described as part of DLP policies, for example, via content blades. The frequency of occurrence of the content blades, including the location of occurrence of expressions, phrases and/or keywords in the input text, is reported as the output of the content analysis process.

As used herein, content blades encapsulate rules and logic dedicated to accurately detecting a specific piece of content (such as, for example, a Social Security number, a credit card number or a driver's license number). Also, content blades in an example DLP system can use the technique of describing content via linguistic evidence. Content blades can additionally use detection rules and contextual rules. Detection rules include rules that answer a question such as, "What is in the documents or transmissions?" If the document contains, for example, a personal identification number, then the document may qualify as a sensitive document. The context rules leverage the contextual evidence and answer a question such as, "How does the evidence appear in the documents?" If the document contains, for example, a personal identification number, a determination is made as to whether the personal identification number is near a name or an address in the document. Once defined, the content blade can be re-used across any number of policies.

Further, detection rules in a content blade can be grouped into inclusion rules and exclusion rules. Inclusion rules include positive detection rules; that is, rules that describe evidence that should be contained in a document. Inclusion rules can be required "Must Occur" rules or optional "May Occur" rules. Exclusion rules include negative detection rules; that is, rules that describe evidence that should not be contained in a document. These rules may be referred to as "Should Not Occur" rules. In at least one embodiment of the invention, exclusion rules cannot be used alone, but are used in conjunction with inclusion rules. Exclusion rules are used to eliminate matching on specific evidence that is causing a false positive match. The matches to exclusion rules are compared to the matches of the inclusion rules, and if the total score is higher for the exclusion rules, that document will not be a match to the content blade. For example, an exclusion rule may be used to stop falsely matching a training document on credit card numbers, which contains valid card numbers and words and phrases. The exclusion rule may discount the document as a match based on the document's title or other linguistic evidence.

Additionally, as noted above, policy enforcement directs a DLP product to allow or deny certain intercepted user actions based on what the action is, who the user is and what items of data are being acted upon. In other words, policy enforcement facilitates a DLP product to take a predetermined action when the product intercepts a user action that results in leakage of sensitive data, and hence, results in violation of an organization's DLP policies.

Generally, text in a file exists in memory as a sequence of bytes of Unicode values of the characters of which the text is composed. However, devices that display letters (such as printers or monitors) do not process characters as Unicode numbers but rather as glyphs which the devices render in a specific manner. As noted above, a glyph is a font-specific representation of a character on a particular device context. The device (for example, printer 210) contains information pertaining to how to render a buffer of glyphs as text of a particular font, size and format.

Before characters can be given to the device 210 for printing or displaying, the characters are converted to glyphs. The DLP intercept component 204 contains an algorithm 205 to convert glyphs to Unicode text. The application 202 directly provides glyphs to the GDI API 206 which is intercepted by the DLP intercept component 204. The algorithm 205 uses font information that is already installed in the operating system to convert the glyphs (which can be understood by the device 210) to Unicode text (which can be understood by content analysis component 212).

In an example scenario (identified as Case One in FIG. 2, wherein the application 202 provides data in plain text that can be classified by the DLP component 204), the text-to-glyph conversion is carried out prior to submitting the data to the device 210 (via device driver interface 208) for printing or displaying of the text. The items of data gathered and analyzed by the DLP component 204 in this case, as noted, are in plain text.

In another example scenario (identified as Case Two in FIG. 2, wherein the application 202 provides data in glyphs that require a glyph-to-text conversion), the conversion from text to glyph is carried out before the GDI APIs are invoked (via component 206). In this example scenario, the items of data passed on to the GDI API component 206 by the printing application 202 are not in plain text but are in the form of buffers of glyphs. As used herein, a buffer of glyphs refers to a sequence of bytes in memory which represent a sequence of glyphs. This sequence of glyphs corresponds to a sequence of Unicode characters and is arrived at after each character in the sequence of Unicode characters is converted to the corresponding glyph, according to the specific device context.

The items of data gathered by the DLP API component 206 are therefore in the form of glyphs as opposed to a plain text format. Additionally, for example, because the content analysis component 212 is designed to search for and identify sensitive and/or targeted content in plain text and not glyphs, the DLP component 204 converts the buffer of glyphs to a buffer of text before the items of data being printed are sent to the content analysis component 212 for classification.

Accordingly, at least one embodiment of the invention includes reusing font-specific information installed in the operating system to back-calculate the text from the glyphs passed onto a particular device context. The font information installed in the operating system (OS) of the machine includes a table of various character ranges and a method by which to calculate a glyph-index, given a particular character. This table is referred to herein as a character map or c-map.

FIG. 3 is a diagram illustrating an example calculation of a glyph for a particular font for a text character's Unicode value derived from a character map 300. As noted by identifier 302, the techniques detailed in connection with FIG. 3 include looking-up a character's Unicode value between the corresponding start and ending Unicode values and obtaining the associated segment. For example, for character i (105), the segment is 0. That is, the Unicode value of character i is 105. 205 is more than 32 (the starting of segment 0) and less than 126 (the ending of segment 0). Hence, character i belongs to segment 0, as indicated by identifier 302 in FIG. 3.

Additionally, as noted by identifier 304, if the offset value for the segment is zero, the glyph value for a particular Unicode value is calculated by adding the delta for that offset. In this example, 29 is subtracted from 105(i). Further, as noted by identifier 306, if the offset value for the segment is non-zero, the glyph value for a particular Unicode value is looked-up in the GLYPHS column after calculating the offset using an indexing mechanism. Specifically, the glyph value for the Unicode text value is located at a specific index in the GLYPHS column. The index can be calculated, via a formula present in the Microsoft's TrueType Font specifications guidelines (MICROSOFT, TrueType Specification, Chapter 2: TrueType font file, Nov. 9, 2012), the contents of which are incorporated by reference herein.

Additionally, once the segment (that is, the value of the first column in character map 300) is identified, the character code offset from the 'Starting Unicode Value' of that row (corresponding to that segment) is added to the 'Offset' value in that row. This sum is used as an offset from the current location within the Offset column itself to index out the correct index in the GLYPH column. The C programming language expression that yields the index in the GLYPH column is:

$$*(idRangeOffset[i]/2+(c-startCount[i])+idRangeOffset[i]),$$

where idRangeOffset is the value of Offset column corresponding to the ith segment, c is the Unicode character code in question which has to be converted to glyph, and i is the segment index (the first column of the row) in which c appears. The DELTA value of the segment (row) is added thereto to obtain the glyph value which is modulo 65536.

Additionally, an example algorithm for calculating the character Unicode values from a glyph, in accordance with at least one embodiment of the invention, includes the following.

(A) For each code segment (i) that has a non-zero delta value:
{
1. Subtract the delta value from the glyph: resultValue=glyph−delta[i];
2. Determine if the resulting value falls in the code segment for that delta value: if (start [i]<resultValue) AND if (end[i]>resultValue);
3. If the resulting value falls in the noted range, this value is the Unicode value of the text that was converted to glyph by the application;
4. Else, continue to the next segment that has a non-zero delta value;
5. If no match is found for any of the segments that have a non-zero delta value, continue to section B, detailed below.
}

(B) For each code segment (i) that has a zero delta value, iterate through all of the Unicode values within the range for that segment, calculate the glyph according to a formula such as for the formula for converting text to glyph noted herein, and return the first character Unicode value with a calculated glyph that matches the glyph needed to convert to text. Accordingly, step (B) includes iterating through each possible text value, converting each text value to a glyph and determining if the glyph matches with the input glyph value. The input glyph value, as mentioned above, is an input to the DLP intercept from the application that is printing some text and has already converted that text to glyph.

Figure 4:
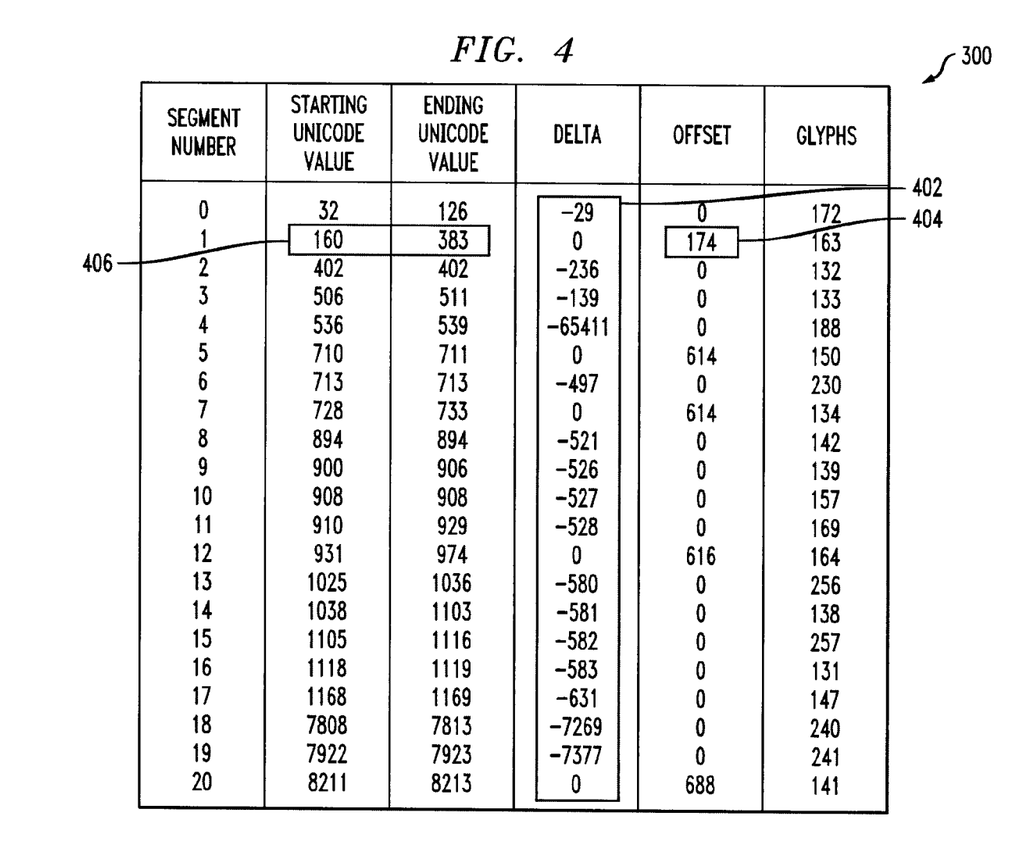
FIG. 4 is a diagram illustrating an example use of a character map to convert glyph to text, according to an embodiment of the invention.

FIG. 4 is a diagram illustrating an example use of a character map 300 to convert glyph to text, according to an embodiment of the invention. As noted by identifier 402, the techniques detailed in connection with FIG. 4 include iterating through the DELTA column of the table 300 and subtracting the delta value to determine if the result falls within the range of the given segment. For example, if the glyph value is 76, the possible value, (76−(−29))=105, falls within the range for (−29), which is between 32 and 126. That makes 76 the correct value, and the value that is to be returned. More specifically, the input glyph value is 79. The first row delta value is −29, which indicates that a glyph calculated from this row (segment) would have been calculated by adding −29 to the Unicode value. This further indicates that a Unicode value calculated by subtracting this delta value must fall within the range of this row/segment, and the range is identified by all Unicode values between 'Starting Unicode Value' and 'Ending Unicode Value' of this row (which is 32 and 126, respectively, in this example). The value 79−(−29)=105 indeed falls between 32 and 126, indicating that if Unicode value was 105, the glyph value would have been 76. This also means that for a glyph value of 76, the Unicode value is 105.

Additionally, as noted by identifier 404, if the iterations carried out in connection with identifier 402 provide no useful result that indicates that the glyph was looked-up in the GLYPHS column of table 300 using the step associated with identifier 304, as detailed in connection with FIG. 3. As such, the correct text will correspond to ranges with a non-zero offset value. Further, as noted by identifier 406, the techniques detailed in connection with FIG. 4 also include iterating through each character value in the ranges corresponding to non-zero offsets. Additionally, the resulting glyph value is compared with the input value, and the first character value for which the glyph value matches the input glyph value is returned.

Figure 5:
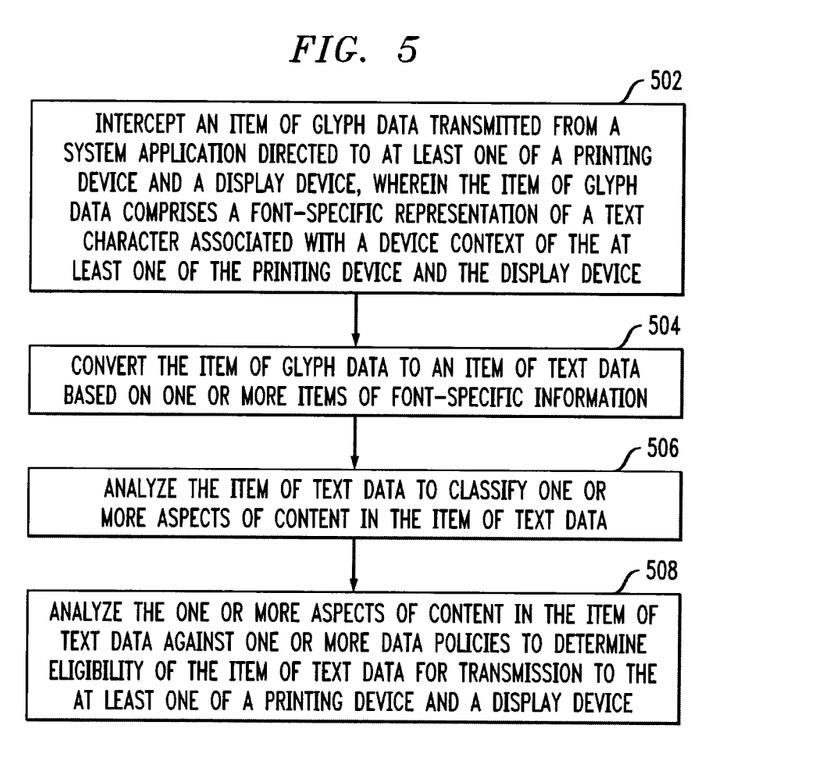
FIG. 5 is a flow diagram illustrating techniques according to an embodiment of the invention.

FIG. 5 is a flow diagram illustrating techniques according to an embodiment of the present invention. Step 502 includes intercepting an item of glyph data transmitted from a system application directed to at least one of a printing device and a display device, wherein the item of glyph data comprises a font-specific representation of a text character associated with a device context of the at least one of the printing device and the display device. Step 504 includes converting the item of glyph data to an item of text data based on one or more items of font-specific information. Font-specific information includes already-installed font-specific information in the system. For example, font-specific information can include a table (for example, a character map) of one or more text character ranges and instructions by which to convert and/or calculate an item of text data given an item of glyph data.

Step 506 includes analyzing the item of text data to classify one or more aspects of content in the item of text data. Analyzing the item of text data to classify aspects of content can include classifying the aspects of content based on the presence of one or more keywords, wherein the keywords are pre-defined as part of a data policy (for example, a data loss prevention policy). Step 508 includes analyzing the one or more aspects of content in the item of text data against one or more data policies to determine eligibility of the item of text data for transmission to the at least one of a printing device and a display device. The analyzing step can include analyzing the aspects of content to determine eligibility of the item of text data for transmission based on an action associated with the one or more items of text data, and/or a user associated with the one or more items of text data.

The techniques depicted in FIG. 5 can also include blocking the transmission and/or enabling continuation of the transmission to the at least one of a printing device and a display device based on said determined eligibility of the item of text data for transmission to the at least one of a printing device and a display device.

Figure 6:
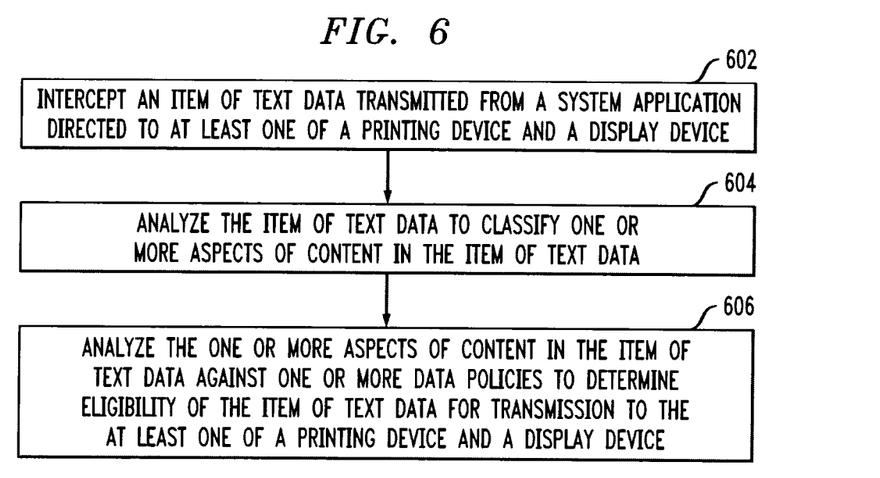
FIG. 6 is a flow diagram illustrating techniques according to an embodiment of the invention.

FIG. 6 is a flow diagram illustrating techniques according to an embodiment of the present invention. Step 602 includes intercepting an item of text data transmitted from a system application directed to at least one of a printing device and a display device. Step 604 includes analyzing the item of text data to classify one or more aspects of content in the item of text data. Step 606 includes analyzing the one or more aspects of content in the item of text data against one or more data policies to determine eligibility of the item of text data for transmission to the at least one of a printing device and a display device.

The techniques depicted in FIG. 6 can also include blocking the transmission and/or enabling continuation of the transmission to the at least one of a printing device and a display device based on said determined eligibility of the item of text data for transmission to the at least one of a printing device and a display device.

Techniques of the type described herein may be implemented in a wide variety of different applications. An additional exemplary communication system application that may incorporate such techniques will now be described with reference to FIG. 7.

Figure 7:
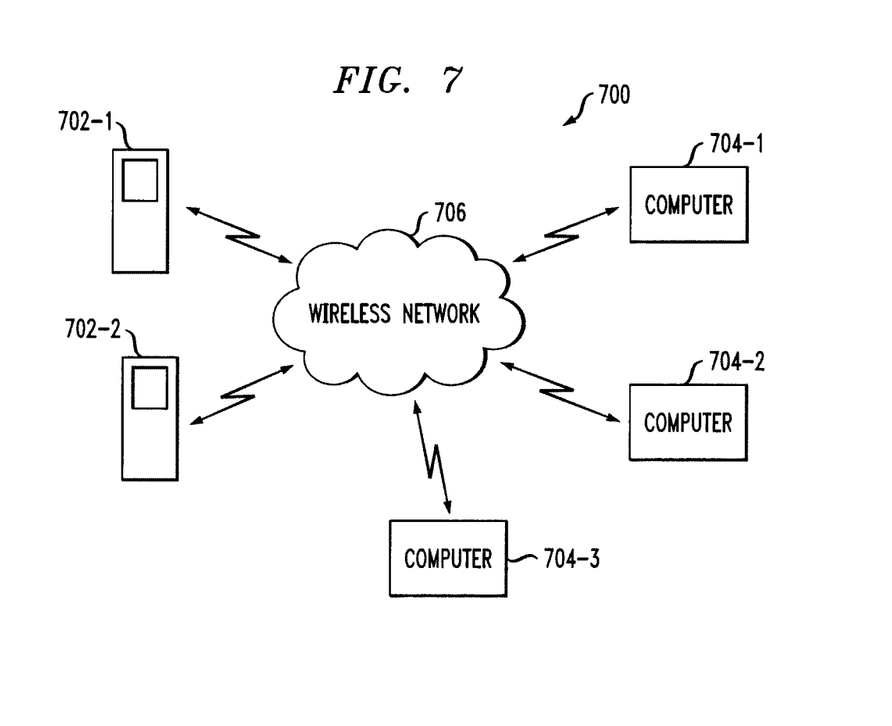
FIG. 7 shows an exemplary embodiment of another communication system that may incorporate functionality of the type illustrated in at least one embodiment of the invention.

Referring to FIG. 7, a communication system 700 comprises a plurality of mobile telephones 702-1 and 702-2 and computers 704-1, 704-2 and 704-3, configured to communicate with one another over a network 706.

Any two or more of the devices 702 and 704 may correspond to devices configured to implement at least one embodiment of the invention (such as interception system 102), as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart(s) and block diagram(s) in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 8:
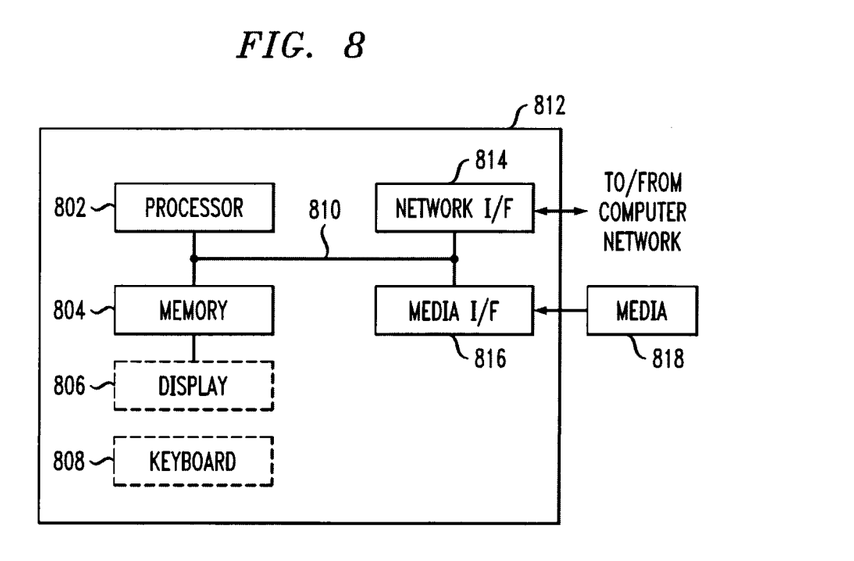
FIG. 8 is a system diagram of an exemplary computer system on which at least one embodiment of the invention can be implemented.

By way of example, an aspect of the present invention can make use of software running on a general purpose computer. As noted above, FIG. 8 is a system diagram of an exemplary computer system on which at least one embodiment of the invention can be implemented. As depicted in FIG. 8, an example implementation employs, for example, a processor 802, a memory 804, and an input/output interface formed, for example, by a display 806 and a keyboard 808. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 802, memory 804, and input/output interface such as display 806 and keyboard 808 can be interconnected, for example, via bus 810 as part of a data processing unit 812 (such as interception system 102). Suitable interconnections via bus 810, can also be provided to a network interface 814 (such as a network card), which can be provided to interface with a computer network, and to a media interface 816 (such as a diskette or compact disc read-only memory (CD-ROM) drive), which can be provided to interface with media 818.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 808, displays 806, and pointing devices, can be coupled to the system either directly (such as via bus 810) or through intervening I/O controllers.

Network adapters such as network interface 814 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 812 as depicted in FIG. 8) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems that can benefit from glyph-to-text conversion techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   intercepting an item of glyph data directed to at least one of a printing device and a display device, wherein the item of glyph data comprises a font-specific representation of a text character associated with a device context of the at least one of the printing device and the display device;
   converting the item of glyph data to an item of text data based on one or more items of font-specific information;
   classifying one or more aspects of content in the item of text data into one of multiple classifications based on (i) the presence of one or more keywords in the item of text data, (ii) the frequency of the one or more keywords in the item of text data, and (iii) the location of each occurrence of the one or more keywords in the item of text data, wherein the one or more keywords are pre-defined as part of one or more data policies; and
   analyzing the classified one or more aspects of content in the item of text data against the one or more data policies to determine eligibility of the item of text data for transmission to the at least one of a printing device and a display device.

2. The method of claim 1, wherein said font-specific information comprises a table of one or more text character ranges.

3. The method of claim 1, wherein said font-specific information comprises one or more instructions for converting an item of text data from an item of glyph data.

4. The method of claim 1, further comprising:
   blocking the transmission to the at least one of a printing device and a display device based on said determined eligibility of the item of text data for transmission to the at least one of a printing device and a display device.

5. The method of claim 1, further comprising:
   enabling continuation of the transmission to the at least one of a printing device and a display device based on said determined eligibility of the item of text data for transmission to the at least one of a printing device and a display device.

6. The method of claim 1, further comprising:
   transmitting the item of glyph data to the at least one of a printing device and a display device.

7. The method of claim 1, wherein said analyzing the one or more aspects of content comprises analyzing the one or more aspects of content to determine eligibility of the item of text data for transmission based on (i) the classification of the one or more aspects of the item of text data, (ii) an action associated with the item of text data, and (iii) identity of a user associated with the item of text data.

8. An article of manufacture comprising a processor-readable storage medium having processor-readable instructions tangibly embodied thereon which, when implemented, cause a processor to carry out the steps of the method of claim 1.

9. An apparatus comprising:
   a memory; and
   at least one processor coupled to the memory; and
   one or more modules executing on the at least one processor, wherein the one or more modules comprise:
      a module to intercept an item of glyph data directed to at least one of a printing device and a display device, wherein the item of glyph data comprises a font-specific representation of a text character associated with a device context of the at least one of the printing device and the display device;
      a module to convert the item of glyph data to an item of text data based on one or more items of font-specific information;
      a module to classify one or more aspects of content in the item of text data into one of multiple classifications based on (i) the presence of one or more keywords in the item of text data, (ii) the frequency of the one or more keywords in the item of text data, and (iii) the location of each occurrence of the one or more keywords in the item of text data, wherein the one or more keywords are pre-defined as part of one or more data policies; and
      a module to analyze the classified one or more aspects of content in the item of text data against the one or more data policies to determine eligibility of the item of text data for transmission to the at least one of a printing device and a display device.

10. The apparatus of claim 9, wherein said font-specific information comprises a table of one or more text character ranges.

11. The apparatus of claim 9, wherein said font-specific information comprises one or more instructions for converting an item of text data from an item of glyph data.

12. The apparatus of claim 9, wherein the one or more modules further comprise:
   a module to transmit the item of glyph data to the at least one of a printing device and a display device.

13. A method comprising:

intercepting an item of text data transmitted from a system application directed to at least one of a printing device and a display device;

classifying one or more aspects of content in the item of text data into one of multiple classifications based on (i) the presence of one or more keywords in the item of text data, (ii) the frequency of the one or more keywords in the item of text data, and (iii) the location of each occurrence of the one or more keywords in the item of text data, wherein the one or more keywords are pre-defined as part of one or more data policies; and analyzing the classified one or more aspects of content in the item of text data against the one or more data policies to determine eligibility of the item of text data for transmission to the at least one of a printing device and a display device.

14. The method of claim 13, further comprising:

blocking the transmission to the at least one of a printing device and a display device based on said determined eligibility of the item of text data for transmission to the at least one of a printing device and a display device.

15. The method of claim 13, further comprising:

enabling continuation of the transmission to the at least one of a printing device and a display device based on said determined eligibility of the item of text data for transmission to the at least one of a printing device and a display device.

16. The method of claim 13, wherein said analyzing the one or more aspects of content comprises analyzing the one or more aspects of content to determine eligibility of the item of text data for transmission based (i) the classification of the one or more aspects of the item of text data, (ii) an action associated with the item of text data, and (iii) identity of a user associated with the item of text data.

* * * * *